United States Patent [19]
van der Lely

[11] 4,023,507
[45] May 17, 1977

[54] SOIL CULTIVATING IMPLEMENTS

[76] Inventor: Cornelis van der Lely, 7, Bruschenrain, Zug, Switzerland

[22] Filed: Aug. 1, 1975

[21] Appl. No.: 601,098

[52] U.S. Cl. .................................. 111/6; 172/59; 200/81.9 R; 340/239 R; 239/287; 239/71; 116/112
[51] Int. Cl.² ..................................... A01C 23/02
[58] Field of Search ............... 116/112, 117 R; 239/71–72, 98 B, 98 C; 200/81.9 R; 111/1, 6, 51, 10–13; 172/176, 59, 110–112; 340/239

[56] References Cited

UNITED STATES PATENTS

| | | | |
|---|---|---|---|
| 2,798,215 | 7/1957 | Domingo et al. | 200/81.9 R X |
| 2,907,015 | 9/1959 | Young | 200/81.9 R X |
| 3,121,973 | 2/1964 | Phillips et al. | 111/7 X |
| 3,146,740 | 9/1964 | Phillips | 111/7 |
| 3,170,421 | 2/1965 | Norris et al. | 111/1 |
| 3,194,194 | 7/1965 | Phelps | 111/6 |
| 3,316,865 | 5/1967 | Williams | 111/6 |
| 3,422,776 | 1/1969 | Gregory | 111/51 |
| 3,741,137 | 6/1973 | Eisenhardt | 111/6 |
| 3,791,322 | 2/1974 | van der Lely et al. | 111/7 |
| 3,885,633 | 5/1975 | van der Lely et al. | 172/59 X |

*Primary Examiner*—Robert E. Bagwill
*Attorney, Agent, or Firm*—Mason, Mason & Albright

[57] ABSTRACT

An implement, preferably a harrow having a row of soil working members mounted on upwardly extending shafts, has spraying nozzles for dispensing material on the ground adjacent the rear of the soil working members. The nozzles communicate with liquid material under pressure. The implement is coupled to a tractor and the operator of the tractor can monitor the material being sprayed by various devices in an electrical circuit that leads to the tractor. Wires are positioned to be bridged by the spray and indicator lights on the tractor dash board provide a visual signal when material is sprayed by each nozzle. Similarly, a micro switch or camera, or other actuation means can be located adjacent each nozzle to provide a signal for each nozzle spray. The nozzles communicate with an elongated pipe and the pipe is supported on the implement frame with adjusting means to change the direction of spray by the nozzles. A supporting roller member is connected at the rear of the frame and the pipe, with nozzles, is positioned between the soil working members and the roller member.

27 Claims, 10 Drawing Figures

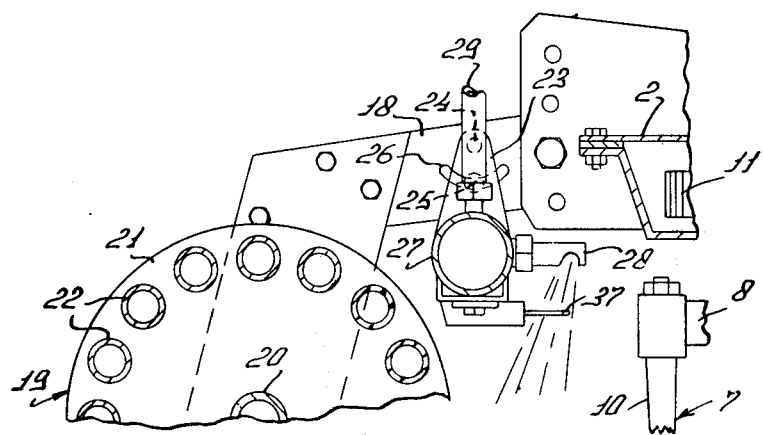
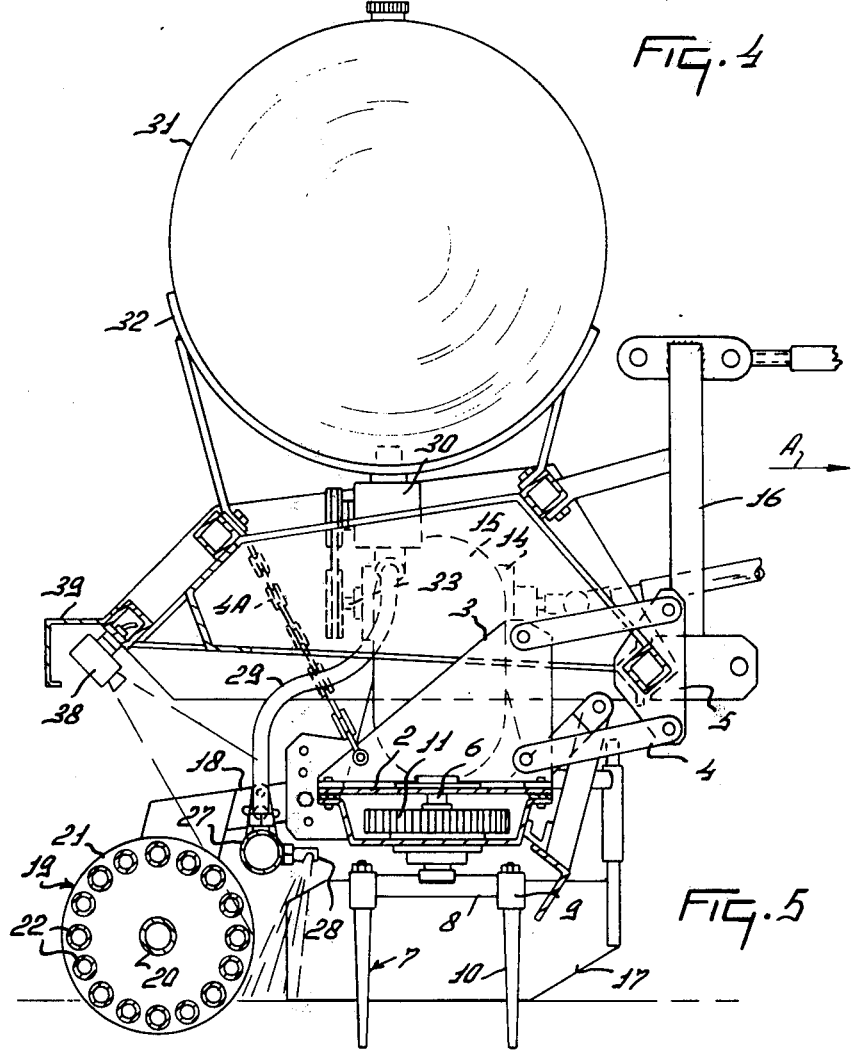

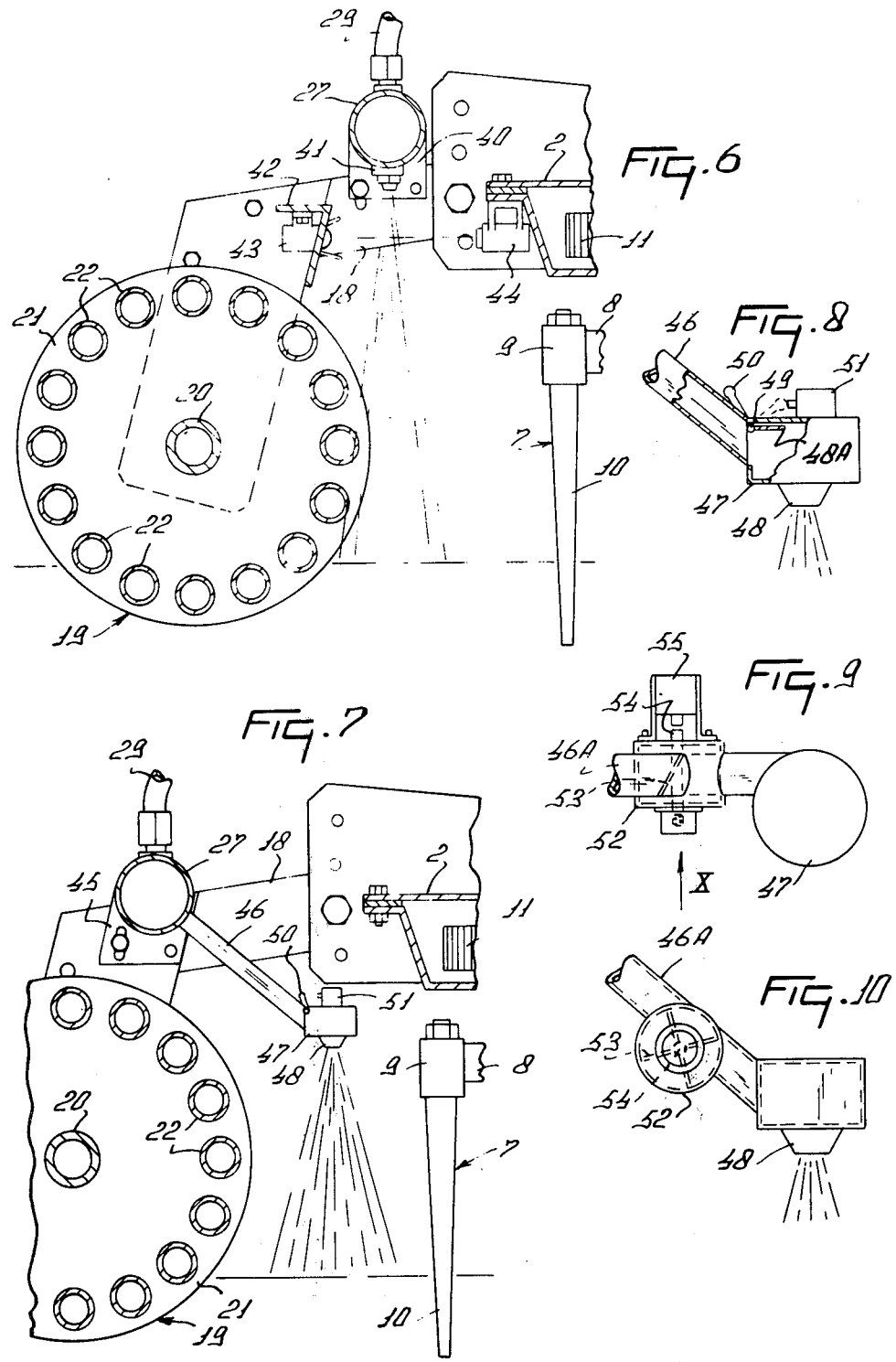

SOIL CULTIVATING IMPLEMENTS

Figure 1:
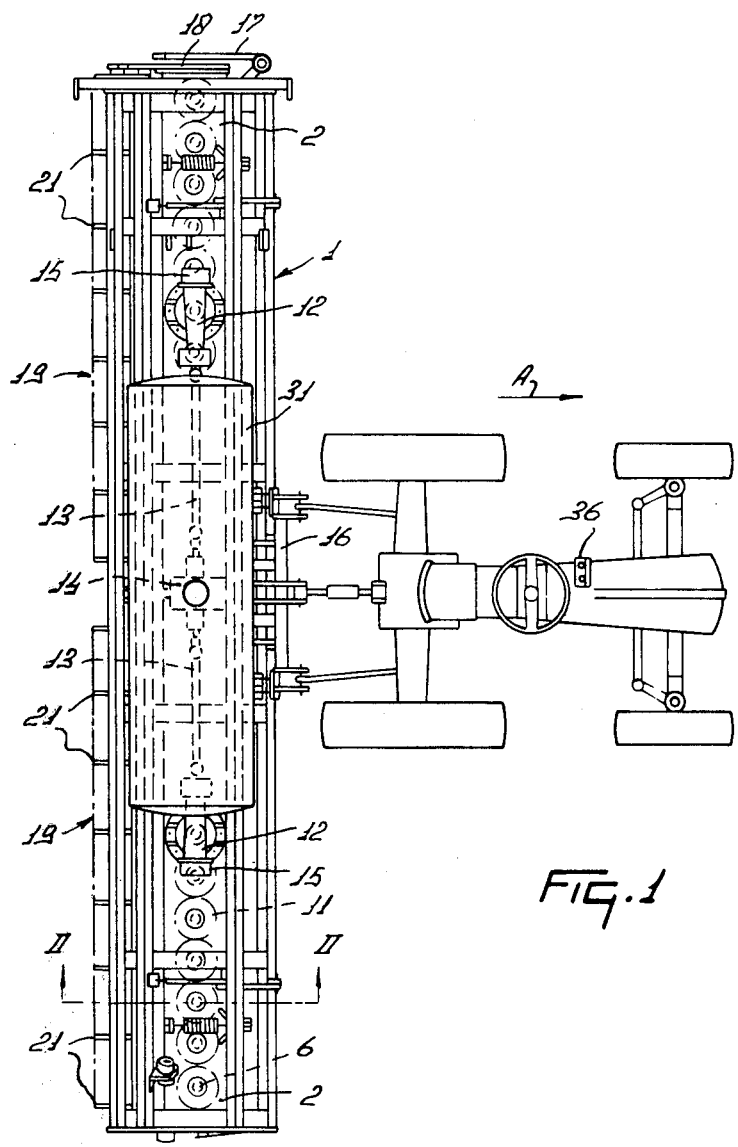
Figure 2:
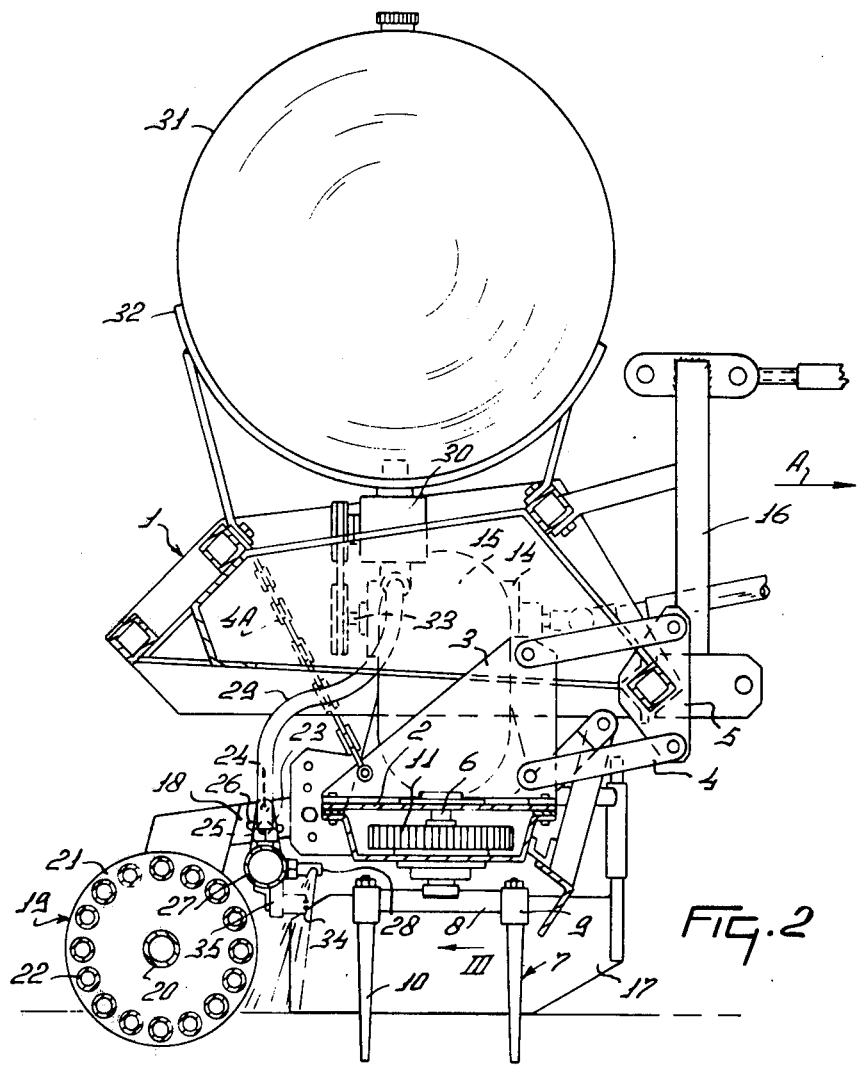
Figure 3:
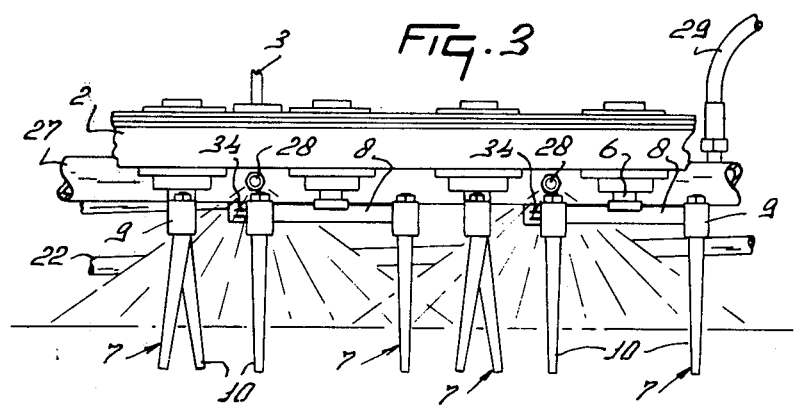

For a better understanding of the invention and to show how the same may be carried into effect, reference will now be made, by way of example, to the accompanying drawings, in which:

FIG. 1 is a somewhat diagrammatic plan view of a soil cultivating implement or rotary harrow in accordance with the invention connected to the rear of an agricultural tractor, FIG. 2 is a part sectional plan view to an enlarged scale, the section being taken on the line II—II in FIG. 1, FIG. 3 is an elevation as seen in the direction indicated by an arrow III in FIG. 2, FIG. 4 is a close-up of a second embodiment of means for supervising the function of the spraying nozzles, FIG. 5 is part of a sectional plan view corresponding with the plan view of FIG. 2 of a third embodiment of means for supervising the function of the spraying nozzles, FIG. 6 is part of a sectional plan view corresponding with the plan view of FIG. 2 of a fourth embodiment of means for supervising the function of the spraying nozzles, FIG. 7 is part of a sectional plan view corresponding with the plan view of FIG. 2 of a fifth embodiment of means for supervising the function of the spraying nozzles, FIG. 8 is on an enlarged scale a partial section of the arrangement of the supervising means in FIG. 7, FIG. 9 shows a sixth embodiment of means for supervising the function of the spraying nozzles, FIG. 10 is a side elevation of FIG. 9 as seen in the direction indicated by an arrow IX in FIG. 9.

Referring to the Figures of the accompanying drawings the soil cultivating implement or rotary harrow which is illustrated therein will be referred to throughout the remaining descriptive portion of this Specification merely as a rotary harrow for the sake of brevity.

The rotary harrow has a supporting structure 1 which comprises a plurality of frame beams that extend substantially horizontally transverse and normally substantially horizontally perpendicular to the intended direction of operative travel of the harrow which is indicated by an arrow A in FIG. 1 and 2 of the drawings. The frame beams are rigidly interconnected by a number of supports that all extend substantially parallel to the direction A. Two hollow box-shaped frame portions 2 are provided beneath the supporting structure 1 so as to extend in substantially longitudinal alignment with one another in a direction perpendicular to the direction A with their neighbouring ends in very close substantially adjoining relationship. Each frame portion 2 carries a corresponding group of rotary soil working members. The top of each frame portion 2 is provided at two locations which are spaced from its opposite ends with corresponding upright supports 3 which, as can be seen in FIG. 2 of the drawings, are of substantially, although not exactly triangular shape. The lowermost edge of each support 3 extends throughout the width in the direction A of the corresponding frame portion 2 while its leading edge with respect to the direction A is substantially vertically disposed. The supports 3 thus taper in an upward direction and it will be seen from FIG. 1 of the drawings that the two supports 3 which are nearest to the substantially adjoining ends of the two frame portions 2 are closer to those substantially adjoining ends than are the other two supports 3 which are nearer to the other two ends of the two frame portions 2 that are relatively remote from one another. Horizontal pivots connected to the ends of two arms 4 to each support 3 at the front thereof with respect to the direction A and near the top and bottom of that support. The arms 4 extend more or less horizontally forwards from the corresponding supports 3 and their leading ends are turnably connected by further substantially horizontal pivots to upright brackets 5 which are rigidly secured to one of the beams of the supporting structure 1. As will be evident from FIG. 2 of the drawings, each frame portion 2 is thus connected to the frame structure 1 by a corresponding dual parallelogram linkage which allows that frame portion 2 to move upwardly and downwardly relative to the supporting structure 1 during the use of the harrow independently of the other frame portion 2. Chains 4A are provided to limit the downward displacement of each frame portion 2 that can take place relative to the supporting structure 1 during operation of the rotary harrow and during inoperative transport of the latter.

Each frame portion 2 rotatably supports by means of corresponding upper and lower bearings a row of twelve upwardly extending and normally substantially vertically disposed shafts 6, the axes of rotation of said shafts 6 being regularly spaced apart from one another at intervals which preferably have magnitudes of substantially 25 cm. Each shaft 6 embodies the axis of rotation of a corresponding soil working member 7 that is secured to a portion of that shaft 6 which projects from beneath the bottom of its frame portion 2. Each soil working member 7 comprises a substantially horizontal tined support 8 which is secured centrally to the corresponding shaft 6 and two substantially vertically disposed and substantially cylindrical tine holders 9 that are integrally or otherwise fixedly mounted at the opposite ends of the support 8. The two holders 9 of each soil working member 7 receive the upper gastening portions of corresponding downwardly extending soil working tines 10. A lower portion of each tine 10 is an active or soil working portion which is arranged to penetrate into the soil in substantially the manner shown in FIG. 2 of the drawings during operation of the harrow and which occupies a downwardly and rearwardly inclined trailing disposition with respect to its overlying fastening portion and with respect to the intended direction of rotation of the soil working member 7 concerned. The tines 10 of each member 7 are a little further apart from one another than are the axes of rotation embodied in immediately neighbouring shafts 6 so that the pathes described by the lowermost free ends or tips of the active or soil working portions of those tines 10 overlap one another to produce a single broad strip of worked soil in respect of each frame portion 2 during the use of the harrow. Each shaft 6 is provided inside the corresponding hollow frame portion 2 with a toothed pinion 11 which has straight or spur teeth. The teeth of twelve pinions 11 that correspond to each of the two groups of soil working members 7 are in intermeshing relationship in the manner which can be seen in outline in FIG. 1 of the drawings. One shaft 6 of the central pair of the row of twelve shafts 6 that correspond to each frame portion 2 has an upward extension into a corresponding gear-box 12 that is mounted on top of the frame portion 2 concerned. Each shaft extension is provided inside the corresponding gear-box 12 with a bevel pinion whose teeth are in driven mesh with those of a further bevel pinion carried by a substantially horizontal shaft that extends parallel to the length of the frame portion 2 concerned and thus substantially perpendicular to the direction A. One splined end of each substantially horizontal shaft extends into a corresponding change-speed gear 15 together with the splined end of an overlying parallel shaft. Different transmission ratios between the two shafts whose ends project into the corresponding change-speed gears 15 can be obtained by exchangeable and/or interchangeable mounting on those ends cooperating pairs of straight or spur toothed pinions of different sizes. Each change-speed gear 15 comprises a releasably mounted cover which encloses the chosen pair of toothed pinions and keeps them free from contamination by dirt during the operation of the harrow. Each of the upper substantially horizontal shafts that have ends entered in the change-speed gears 15 has its opposite end connected by way of an overload release clutch and a universal joint with one end of a corresponding shaft 13.

The opposite and closer ends of the two shafts 13 are connected by further universal joints to the ends of two output shafts of a central gear-box 14 that projects substantially horizontally from opposite sides of that gear-box in directions that are substantially perpendicular to the direction A. The central gear-box 14 is secured to the supporting structure 1 and has a rotary input shaft shows splined or otherwise keyed end projects forwardly from the front of that gear-box in substantially the direction A. The rotary input shaft is provided inside the gear-box 14 with at least one bevel pinion whose teeth are in mesh with further bevel pinions carried by the two output shafts of the gear-box. A coupling member or trestle 16 of generally triangular configuration is rigidly secured to the supporting structure 1 at the front of that structure with respect to the direction A and enables said structure to be connected to the three-point lifting device or hitch at the rear of an agricultural tractor or other operating vehicle in the generally known manner which is illustrated in outline in FIG. 1 of the drawings.

The relatively remote ends or the two frame portions 2 are provided with corresponding substantially vertical shield plates 17 that both normally extend substantially parallel to the direction A. Each shield plate 17 is turnable about the axis of a corresponding upright pivot relative to the frame portion 2 concerned to enable it to yield outwardly against the action of a coil spring that is wound around the corresponding pivot in the event of a stone or the like becoming momentarily trapped between the shield plate 17 and the neighbouring soil working member 7. The shield plate 17 minimizes ridging at the boundaries of the broke strip of land that is worked by the harrow and substantially prevents stones and other sharp objects from being flung laterally of the path of travel of the harrow by its rapidly moving tines 10 when the harrow is in operation. Each end of each of the two frame portions 2 comprises a corresponding substantially vertical plate alongside which a corresponding arm 18 is turnable upwardly and downwardly about a substantially horizontal axis that is afforded by a strong pivot mounted at the top of the end plate concerned and at the front thereof with respect to the direction A.

As will be evident from FIG. 2 of the drawings, the end plates are provided with a number of holes through which bolts can be entered in order to retain the arms 18 in a number of chosen angular settings about the axes defined by the pivotal mountings of those arms relative to the frame portion 2. The rearmost ends of each pair of arms 18 with respect to the direction A carry downwardly directed brackets and two rotatable supporting members that are in the form of open ground rollers 19 are rotatably mounted in bearings carried by the two arm brackets that correspond to each frame portion 2. Each ground roller 19 comprises a centrally axially mounted tubular support 20 which carries at regular intervals along its length a plurality of substantially vertical plates 21, a plurality such as eight of tubular or rod formation elongated elements 22 being entered through peripheral holes in the plates 21 in such a way that each element 22 is wound helically around the axis of the corresponding tubular support 20 to some extent. It will be apparent that the angular settings of the arms 18 which are chosen relative to the end plates of the frame portions 2 dictate the level of the axes of rotation of the two rollers 19 with respect to those frame portions and thus the depth to which the tines 10 of the soil working members 7 can penetrate into the ground. Each arm 18 is provided with a downwardly extending support 23 which is pivotably connected by means of a pin 24 and can be brought into a number of chosen settings by means of a bolt 25 which is inserted in a slot 26 in each of the arms 18, the slot having a curvature which coincides with the corresponding pivot pin 24. Each pair of supports 23 carries a transverse and substantially horizontally extending pipe 27 which, at its front at regular intervals, is provided with a number of spraying nozzles 28. Hereby the distance between two spraying nozzles is substantially equal to two times the distance between the axes of rotation of two neighbouring soil working members 7 which is approximately 25 cm. As shown in FIG. 3, between two spraying nozzles 28 there are disposed two soil working members 7. Each pipe 27 near its center is connected to one end of a flexible hose 29 which with its other end is connected to a pump 30. The pump 30 is located underneath a container 31 which, by means of struts 32, is fixed to the upper side of the supporting structure 1. The drive of the pump 30 is achieved by means of a branch shaft 33 which is disposed at the rear of the gear-box 14 and is directly coupled with the shaft that can be coupled to the P.T.O. of the tractor.

For each spraying nozzle 28 there is provided means for supervising its spraying function. This means comprises for each spraying nozzle 28 a pair of wires 34, the ends of which are arranged as with a spark-plug. The wires 34 are connected to supports 35 on the pipe 27 and form part of an electric circuit which comprises an indication means for instance a green light 36, on the dashboard of the tractor moving the machine.

In the use of the rotary harrow that has been described its coupling member or trestle 16 is connected to the three-point lifting device or hitch at the rear of an operating tractor or other vehicle and the rotary input shaft of the central gear-box 14 is placed in driven connection with the power take-off shaft of the same tractor or other vehicle by way of an intermediate telescopic transmission shaft, that is of a construction which is known per se having universal joints at its opposite ends. The levels of the axes of rotation of the two rollers 19 will previously have been set relative to those of the corresponding frame portions 2, having regard to the nature of the soil that is to be worked and to the operating conditions, thus dictating the depth to which the tines 10 can penetrate into the soil. It will be remembered that the two groups of soil working members 7 that correspond to the two frame portions are movable upwardly and downwardly independently of each other with respect to the supporting structure 1 during operation of the harrow. Also the two change-speed gears 15 will have been pre-set to give appropriate transmission ratios between the two shafts which each of them comprises so that the soil working members 7 will rotate at a faster or slower speed without having to alter the input speed of rotation applied to the central gearbox 14 by the power take-off shaft of the operating tractor or other vehicle.

As the harrow moves over the ground that is to be cultivated, neighbouring soil working members 7 rotate in the opposite directions that are indicated by arrows in FIG. 1 of the drawings and a plant growth stimulating material such as a fluid fertilizer which could, for example, be ammonia, or a weed or insect killer or other chemical fluid material can be sprayed by means of the pump 33 and the row of spraying nozzles 28 which are disposed between each group of soil working members 7 and a corresponding roller 19. Hereby the material is sprayed in a way as has been indicated in FIG. 3 whereby the strips of soil which have been sprayed overlap each other slightly. The spraying of the material takes place in the immediate proximity of the rotary soil working members and in the region between those tines and the immediately following rollers 19 which consolidate and flatten the worked soil to some extent, simultaneously breaking up any uncrushed lumps of soil displaced by the tines 10. Thus the material is brought upon the soil where the soil is in a well-broken condition so that the material can become uniformly dispersed therein. By means of the pivotable supports 23 each spraying nozzle 28 carrying pipe 27 can be brought into a number of positions wherein the spraying nozzles are disposed in a position which is inclined to the position shown in FIG. 2.

During operation the wire-ends are disposed in such a way that the fluid discharged from each nozzle is spread against the wire ends and the electric circuit is closed so that the indication means is actuated, i.e. the green light on the dashboard shines. In case one or more of the nozzles stop spraying, the circuit is interrupted and the indication means is no longer actuated, i.e. the green light no longer shines.

In FIG. 4 an embodiment is shown whereby instead of two wire ends a sensitive micro-switch 37 is arranged in the fluid stream coming from each of the nozzles during operation. With this embodiment the indication means for instance said green light on the dashboard, is switched off when a spraying nozzle does not function correctly.

With the embodiment shown in FIG. 5, at the rear of the supporting structure 1 at a location near the center of each group of soil working members 7 there is provided a camera 38 which, during operation, can be brought into a reciprocating movement in order to control the function of each of the said spraying nozzles 28. The camera 38 is connected in a known manner to a monitor which is mounted on the tractor. Each of the said cameras 38 is located inside a cover 39 which is connected to the rear of the supporting structure 1.

During operation, each of the cameras 38 near the center of each group of soil working members moves reciprocately in such a way that each row of spraying nozzles can be controlled by means of the monitor on the tractor. In case one or more of the nozzles stop spraying material, this will be immediately indicated on the monitor and thus the tractor driver is able to stop and take the necessary steps regarding the proper function of the spraying nozzles.

The embodiment shown in FIG. 6 also comprises a pipe 27 which by means of pivotable supports 40 that can be brought in a number of chosen settings, is connected between the arms 18. With this embodiment the spraying nozzles 41 are disposed at the lower side of the pipe at intervals which correspond with the intervals between the spraying nozzles 28 of the foregoing embodiment. To the rear of each pipe 27 between the arms 18 of a roller 19 there is provided a support 42 to which a number of light sources 43 afforded by lamps are connected which, with respect to the direction of travel, lie directly behind a spraying nozzle 41 in such a way that the light of each source 43 is shut off by the curtain of sprayed material. In front of the respective light sources 43 there are provided a number of photoelectric cells 44 which are fixed to the rear of each box-shaped frame portion 2. In case, during operation, one or more of the nozzles 41 stop spraying, the light of the source 43 will hit the photoelectric cell 44 placed in front of it and thus an indication means on the tractor, for instance a red lamp, is actuated to warn the driver.

With the embodiment shown in FIGS. 7 and 8, between the arms 18 a pipe 27 is connected by means of supports 45 which also can be brought in a number of settings in order to alter the position of the pipe. With this embodiment each pipe 27 is provided with a number of downwardly and forwardly extending discharge outlets 46 which lie at regular intervals which correspond with the intervals between the spraying nozzles 28 and 41, with the afore-mentioned embodiments. Each outlet 46 discharges in a house 47 which at its lower side is provided with a spraying nozzle 48. There where the outlet 46 merges into the house 47 there is provided a pivotable flap 48A, the said flap being pivotable about a shaft 49 which at one end outside the outlet is provided with a lever 50 which lever can contact a switch 51 disposed on the upper side of the house 47. By means of the switch 51 an indication means on the tractor can be actuated. During operation, when each of the spraying nozzles 48 functions properly, due to the stream of material, the pivotable flap 48A has a setting as is indicated with full lines in FIG. 8. Hereby the lever 50 is out of contact with the switch 51. However, in case a spraying nozzle 48 stops spraying, the stream of material is interrupted and the flap 48A, by means of its own weight or an additional weight, moves to a position as is indicated with broken lines in FIG. 8. Hereby the lever 50 touches the switch 51 and thus actuates the indication means on the tractor so that the tractor driver is warned.

With the embodiment shown in FIGS. 9 and 10 the outlet 46A is provided with a cylindrical house 52 in which is supported a rotatable fan wheel 53, its axis of rotation coinciding with the center line of the cylindrical house. The shaft 54 of the wheel 53 is movable against resilient opposition to one direction whereby an end portion of this shaft is out of contact with a switch 55. The fans of the fan wheel 53 are arranged in such a way that the fan wheel, by means of the material sprayed through the nozzle, is urged against the resilient opposition so that the switch 55 is not contacted by the shaft 54 (see FIG. 9). In case, however, the stream of material is interrupted due to the not functioning of the nozzle, the fan wheel by means of the resilient opposition is moved in such a way that the end of the shaft touches the switch which immediately actuates an indication means on the tractor and thus warns the tractor driver.

By way of the constructions given in the above-mentioned various embodiments, the tractor driver can be warned in a very simple and effective way when something is wrong with the spraying action of the nozzles.

What is claimed is:

1. An agricultural implement comprising an elongated frame and a plurality of soil-working members mounted on said frame in a row that extends transverse to the direction of travel, said members having tines and being rotatable about upwardly extending axes defined by corresponding shafts depending from said frame, driving means connected to rotate said members and said tines to work the soil during operation, a rotatable supporting member being connected to the frame and located to the rear of said soil-working members, said supporting member being a roller that is rotatable about a substantially horizontal axis and spraying means being located between said soil-working members and said roller, said spraying means comprising nozzles in communication with a source of fluid material to be sprayed, said nozzles being mounted on support means and positioned adjacent the soil-working members at the rear thereof, whereby material is sprayed in the immediate proximity of the soil-working members during operation.

2. An implement as claimed in claim 1, wherein said spraying nozzles are arranged at regular intervals to the rear of said row of said soil-working members.

3. An implement as claimed in claim 2, wherein the distance between two neighboring spraying nozzles is about twice the distance between two upwardly extending shafts of two neighboring soil-working members.

4. An implement as claimed in claim 3, wherein the distance between the shafts of neighboring soil-working members is about 25 centimeters.

5. An implement as claimed in claim 4, wherein, as seen in the direction of travel, there are two soil-working members positioned between two spraying nozzles.

6. An implement as claimed in claim 4, wherein said spraying nozzles are located at about the same level as the upper part of said soil-working members.

7. An implement as claimed in claim 1, wherein said roller is coupled to said frame by arms and said nozzles are mounted on a pipe which is carried by said arms.

8. An implement as claimed in claim 7, wherein said pipe is coupled to said arms by supports and said supports can be vertically adjusted into a number of settings with respect to said arms.

9. An implement as claimed in claim 8, wherein said spraying nozzles are mounted on the front side of said pipe.

10. An implement as claimed in claim 1, wherein said roller has a periphery comprised by a plurality of longitudinal elements which extend in substantially the direction of its axis of rotation.

11. An implement as claimed in claim 1, wherein monitoring means is positioned in the path of sprayed material.

12. An implement as claimed in claim 11, wherein said implement is a harrow coupled to a tractor and said monitoring means comprises a camera, a row of spraying nozzles being supported adjacent the camera for supervision, said camera, during operation, being mounted for reciprocating movement, said camera being operatively connected to a visual monitor on the tractor.

13. An implement as claimed in claim 12, wherein the camera is located near the center of the row of spraying nozzles.

14. An implement as claimed in claim 11, wherein said implement is a harrow and the monitoring means comprises a light source and photo-electrical cell combination for each nozzle, said implement being coupled to a tractor and the latter having indication means that is actuated by said combination.

15. An implement as claimed in claim 11, wherein there are a plurality of spraying nozzles and for every spraying nozzle a valve is provided, said valve being connected to a lever, said lever being movable to actuate a switch in an electrical circuit of said monitoring means, said implement being coupled to a tractor and indication means on said tractor being in communication with said switch.

16. An implement as claimed in claim 15, wherein said valve, during normal operation of its corresponding spraying nozzle, has a position in which said lever is out of contact with said switch.

17. An implement as claimed in claim 11, wherein said monitoring means includes a discharge outlet nozzle, a rotatable fan wheel which, during normal operation, is moved against resilient opposition, actuating means connected to said fan wheel and said actuating means being out of contact with a switch in an electrical circuit, said implement being connected to a tractor and said circuit including indication means on said tractor.

18. An implement as claimed in claim 17, wherein said actuating means comprises one end of a shaft that defines the axis of rotation of the fan wheel.

19. An implement as claimed in claim 18, wherein said fan wheel is located inside a cylindrical house and the axis shaft of said fan wheel coincides with the center line of said house.

20. An implement as claimed in claim 11, wherein said monitoring means comprises a contact for each spraying nozzle, said contact forming part of an electrical circuit whereby, when hit by the stream of fluid material, said circuit is closed and indication means is actuated, said indication means being remotely mounted with respect to the nozzle.

21. An implement as claimed in claim 20, wherein said contact includes a pair of wires, the ends of said wires lying closely adjacent one another and said nozzle.

22. An implement as claimed in claim 20, wherein said indication means comprises a green light.

23. An implement as claimed in claim 1, wherein there are a plurality of spraying nozzles carried by a common pipe and said pipe extends substantially horizontal and transverse to the direction of travel of said implement.

24. An implement as claimed in claim 23, wherein a hose is connected to said pipe adjacent the center thereof and said hose communicates with a pump and a container for said material.

25. An implement as claimed in claim 24, wherein said pipe is mounted on supports secured to said frame and adjusting means is associated with said pipe that changes the nozzle spraying direction.

26. An agricultural implement comprising an elongated frame and a plurality of soil-working members mounted on said frame in a row that extends transverse to the direction of travel, said members having tines and being rotatable about upwardly extending axes defined by corresponding shafts depending from said frame, driving means connected to rotate said members and said tines to work the soil during operation, spraying means being located at the rear of said soil-working members and comprising a plurality of nozzles is communication with a source of material to be sprayed, said nozzles being mounted on support means and positioned adjacent the soil-working members at the rear thereof, whereby material is sprayed in the immediate proximity of the soil-working members during operation, said tines having lower portions, and said nozzles being located above said lower portions and directing fluid to soil being worked at the rear of said members.

27. An implement as claimed in claim 26, wherein signal means is associated with said nozzles and said signal means is positioned to be actuated by contact with the material being sprayed.

* * * * *